United States Patent [19]

McCandlish et al.

[11] Patent Number: 5,230,729
[45] Date of Patent: Jul. 27, 1993

[54] CARBOTHERMIC REACTION PROCESS FOR MAKING NANOPHASE WC-CO POWDERS

[75] Inventors: Larry E. McCandlish, Highland Park; Bernard H. Kear, Whitehouse Station; Byoung-Kee Kim, Edison, all of N.J.

[73] Assignee: Rutgers, The State University of New Jersey, Piscataway, N.J.

[21] Appl. No.: 989,955

[22] Filed: Dec. 10, 1992

Related U.S. Application Data

[63] Continuation of Ser. No. 741,327, Aug. 7, 1991, abandoned, and a continuation-in-part of PCT/US90/06550, Nov. 2, 1990, and Ser. No. 433,742, Nov. 9, 1989, abandoned.

[51] Int. Cl.$^5$ .............................. B22F 9/26
[52] U.S. Cl. .................... 75/351; 75/366; 75/370; 423/440
[58] Field of Search ............ 423/440, 447.3; 419/18; 75/351, 363–366, 370

[56] References Cited

U.S. PATENT DOCUMENTS

| | | | |
|---|---|---|---|
| 2,160,670 | 5/1939 | Oswald | 75/137 |
| 2,176,802 | 10/1939 | Romp | 75/137 |
| 3,077,385 | 2/1963 | Robb | 23/208 |
| 3,488,291 | 1/1970 | Hardy et al. | 252/301.1 |
| 3,512,962 | 5/1970 | Holtz | 419/18 |
| 3,932,594 | 1/1976 | Gortsema | 423/440 |
| 4,320,156 | 3/1982 | Oakes et al. | 75/252 |
| 4,579,713 | 4/1986 | Lueth | 419/58 |
| 4,664,899 | 5/1989 | Kimmel et al. | 423/440 |
| 4,851,041 | 7/1989 | Polizzotti et al. | 419/18 |

FOREIGN PATENT DOCUMENTS 3830111 3/1992 Fed. Rep. of Germany .
91-07244 5/1991 World Int. Prop. O. ............ 75/366

OTHER PUBLICATIONS

Gardner et al: Abstract, pp. 227-232, Precursor Chemistry Effects on Development of Particulate Morphology During Evaporative Decomposition of Solutions.
Halliday et al: Abstract, pp. 291-301, Thermodynamic Considerations of the Production of Coblat/Tungsten Carbide Mixture by Direct Gas Phase . . . .
R. Ushuima: Powder Metallurgy, vol. 11, No. 4., 1979.

*Primary Examiner*—George Wyszomierski
*Attorney, Agent, or Firm*—Wood, Herron & Evans

[57] ABSTRACT

A new carbothermic reaction process is described for the thermochemical processing of nanophase WC-Co powders. The process permits shorter reaction times, reduced temperatures, and finer microstructures compared to conventional processing methods.

The process builds on our experience with spray conversion processing but involves 1) chemical vapor infiltration reaction of the carbon infiltrant using a carbon source gas at a carbon activity greater than or equal to 1.0 with the particle substrate to form WC-CO; and 2) removal of any excess (unreacted) carbon by controlled gasification using a gas with carbon activity less than 1.0. A feature of the carbothermic reaction process is its adaptability to conventional WC-Co processing technology, as well as to spray conversion processing technology.

The resulting power particles consist of a network of fine grains, (less than 100 nm) of WC and Co with interconnected fine porosity. Powder particles suitable for subsequent handling and consolidation are readily produced with diameters greater than 10 microns.

14 Claims, 4 Drawing Sheets

CARBOTHERMIC REACTION PROCESS FOR MAKING NANOPHASE WC-CO POWDERS

This application is a file wrapper continuation of application Ser. No. 07/741,327, filed Aug. 7, 1991, abandoned, which is a continuation-in-part of PCT/US90/06550, filed Nov. 2, 1990, and also a continuation-in-part of U.S. Ser. No. 433,742, filed Nov. 9, 1989, abandoned.

FIELD OF THE INVENTION

The present invention discloses and claims a process for the production of nanophase WC-Co powders by thermochemical conversion of homogeneous chemical precursor powders. The process utilizes a carbothermic reaction process, wherein the precursors are thermochemically converted by controlled gas-solid reactions at unexpectedly low temperatures to the nanophase powder products and results in a substantial decrease in overall reaction times.

BACKGROUND OF THE INVENTION

Presently pending U.S. patent application No. 433,742 filed on Nov. 9, 1989 and the continuation in part thereof, having Ser. No. PCT US 90 06550, filed on Nov. 2, 1990, both being incorporated herein by reference, disclose a new spray conversion process for producing novel nanophase WC-Co composite powders. The process involves three main steps: 1) preparation of starting solutions of mixed salts by wet chemistry methods, 2) spray drying, calcining or roasting of the starting solutions to form homogeneous precursor powders, and 3) thermochemical conversion of the precursor powders to the desired end product powders by controlled gas/solid reactions in a fluid bed reactor. Subsequent consolidation of the powders into useable structural forms may be accomplished by thermal spraying, laser surfacing, cold compaction and sintering, and incipient melt forming.

The thermochemical conversion of the precursor powders according to the process disclosed in these above mentioned patent applications occurs over a period of several hours.

The process disclosed herein, which we refer to as the "carbothermic reaction process," is a modification of the spray conversion process, which permits better control of the WC-Co microstructure at the submicron level and greatly improves conversion efficiency.

The original thermochemical process provided a means for producing nanophase WC-Co composite powders with a composition of 23% by weight cobalt. The steps are outlined below:

1. An aqueous solution of $CoCl_2$ is mixed with a solution of $H_2WO_4$ in ethylenediamine (en) to precipitate crystals of $Co(en)_3WO_4$, the prototype precursor compound.
2. The crystalline powders are reductively decomposed to form nanoporous/nanophase W-Co powder (see FIG. 1).
3. The high surface area reactive intermediate, W-Co, is converted to WC-Co or other phases by reaction with $CO_2/CO$ gas mixtures (see FIG. 2).

The nature of the microstructure of the composite is determined by controlling the temperature of the carburization reaction and the carbon activity of the gas phase. The resulting powder particles have roughly the same size ($10 \times 100$ microns) and morphology (hexagonal prismatic rods) as the original particles precipitated from solution, but within these particles the microstructure is a WC-Co nanophase composite, FIG. 3.

Using $Co(en)_3WO_4$ as the precursor compound necessarily fixes the Co/W atom ratio at 50/50 and the resulting WC-Co composition at 23 weight percent Co. This composition is at the low end of WC loadings that are used commercially. Thus, there is a need to extend the compositional range of precursors to include more tungsten. The range of WC-Co compositions of commercial interest is 3–30 weight percent Co.

To overcome this limitation in the original thermochemical process, we have adopted spray drying of solution mixtures as the preferred method of making precursor powders with a range of compositions. In spray drying the solvent phase is rapidly evaporated in a hot gas stream, leaving solid particles that are homogeneous mixtures. Under ideal conditions the solid particles are amorphous or microcrystalline, with no evidence of phase separation, even when starting from multicomponent solutions.

To summarize, our "Spray Conversion Processing" technology involves:

1. Preparation and mixing of the starting solution. This may take the form of premixing or in situ mixing at the spray drying nozzle. The latter is favored when chemical reaction between the components can occur.
2. Spray drying, calcining or roasting of the starting solution to form homogeneous spherical precursor particles. These may be amorphous, microcrystalline, or mixed amorphous/microcrystalline in nature.
3. Thermochemical conversion of the precursor particles by controlled gas-solid reaction in a fluid bed reactor. This involves control of reaction time, bed temperature, and gas composition. See FIG. 4.

In preparing the precursor powders the preferred starting point is an aqueous solution of ammonium metatungstate (AMT), $(NH_4)_6(H_2W_{12}O_{40}) \cdot 4H_2O$ and cobalt nitrate, $Co(NO_3)_2 \cdot 6H_2O$. AMT was chosen because among the polytungstates, it has the highest solubility in water. Water soluble $Co(NO_3)_2 \cdot 6H_2O$ was selected because it decomposes to form non-corrosive $NO_x$ compounds, which are easily scrubbed from the system. Chloride compounds, if used, can cause corrosion of the metal components of the reactor.

The Co/W atom ratio was adjusted to 1.0, 0.63, 0.21, and 0.1 by mixing appropriate quantities of AMT and cobalt nitrate. Spray drying and thermochemical conversion in $CO_2/CO$ gas at a carbon activity of 0.95 yields the resulting nanophase WC-Co powders having 23, 15, 6, and 3 wt % Co binder phase, respectively. The particle microstructure of these powders was substantially the same as that obtained for WC-Co composite made from $Co(en)_3WO_4$ powder.

The thermochemical conversion of precursor powders in a fluid bed reactor has been a substantial improvement in the technology. While one can obtain sufficient powder for characterization purposes using a laboratory-scale fixed bed reactor, it is not easy to obtain the larger quantities needed for mechanical property evaluations, much less produce commercial quantities of powders for field testing. The difficulty has been circumvented by adopting an industrial-scale fluid bed reactor as the means for controlled thermochemical conversion of the precursor powder to WC-Co nanophase composite powder. A fluid bed reactor is ideal for thermochemical conversion of the precursor powder because of the uniform bed temperature and constant gas/solid environment throughout the bed.

SUMMARY OF THE INVENTION

Figure 1:
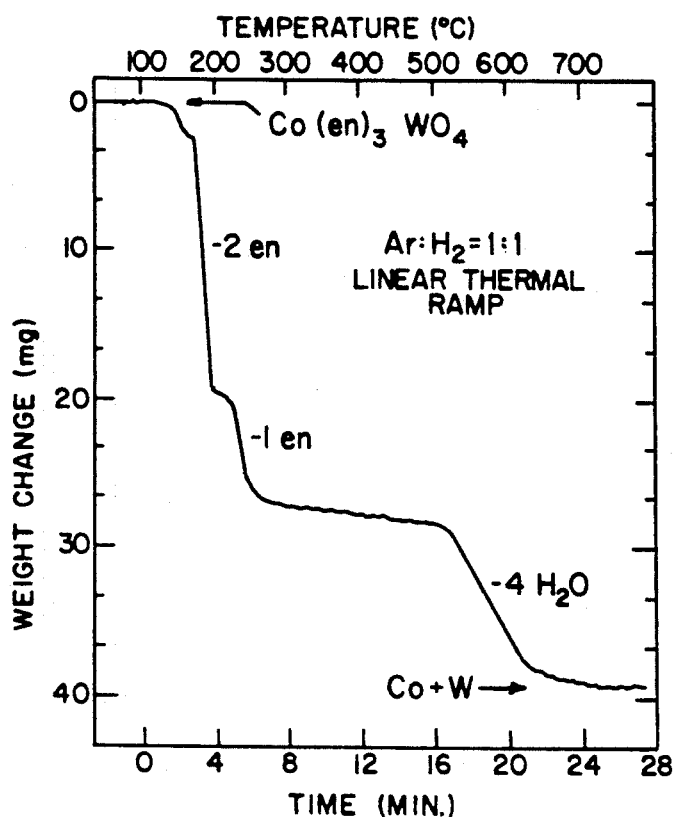
FIG. 1 is a graph depicting the reductive decomposition of Co(en)$_3$ WO$_4$ powder.
Figure 2:
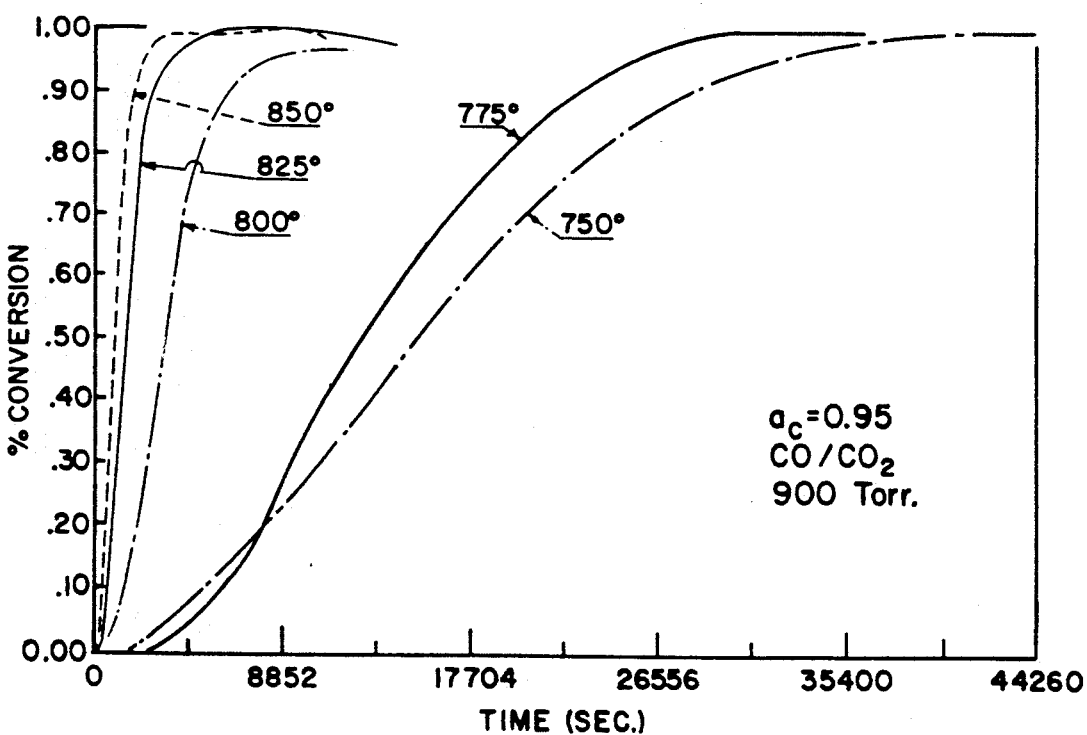
FIG. 2 is a graph showing the conversion of W-Co to nanophase WC-Co powder by carburization.
Figure 3:
FIG. 3 is a photomicrograph showing the morphology of WC-Co powders prepared from Co(en)$_3$ WO$_4$ powder.

An object of the present invention is to provide a method for producing nanoscale microstructures of WC-Co at reduced reaction temperatures and reduced reaction times, and the use of an external carbon bed as a CO regenerator for a more efficient process.

It is a further object to provide a method for producing nanoscale microstructures of WC-Co powder.

We have improved the conversion efficiency and reduced the microstructural scale by our new improvements in the technology, which we call carbothermic reaction processing. Until recently all thermochemical conversions were conducted in CO$_2$/CO gas mixture with carbon activities in the range 0.35 to 0.95. In all cases, the rapid initial uptake of carbon gives rise to a metastable phase, prior to its conversion to the thermodynamically stable WC-Co composition. This has two consequences. First, the metastability of the intermediate phase or phases prolongs the overall conversion time and increases the cost. Second, the longer reaction time permits particle coarsening and limits the ultimate microstructural scale attainable. For example, if reduction of the precursor powder yields a nanophase mixture of W and Co, the carburization step may result in the coarsening of the microstructure from 0.01 to 0.3 microns. Even coarser microstructures can be generated by carburization at higher temperatures.

However, we have discovered that the rapid carbon uptake in the first stage of carburization is the key to reducing the microstructural scale of the WC-Co powder. Such uptake of carbon occurs at unexpectedly low temperatures, apparently because of catalytic decomposition of CO by the cobalt phase. This phenomenon can be exploited to deposit amorphous carbon within the nanopores of the W-Co particles at low temperatures. The high dispersion of carbon throughout the W-Co particles and the short diffusion distances accelerate the conversion to WC-Co, while preserving the desirable ultrafine microstructure. Thus, the microstructure can easily be reduced below 0.1 micron and there is the potential for achieving 0.01 micron or less in WC grain size.

We have also discovered that a substantial decrease in conversion time is realized by carburizing at an activity in excess of 1.0 and then completing the conversion at a carbon activity below 1.0, preferably about 0.5. In the examples set forth below, we will show that reaction times can be as low as 45 minutes. This amounts to a tenfold and greater decrease in time compared to the time necessary to effect total carburization of the powders converted according to our previously disclosed processes. In those processes the carbon activity was held substantially constant throughout the entire carburization process.

In practice, the amount of carbon introduced exceeds the stoichiometric requirement for the complete conversion to WC-Co. This fixes the carbon activity during the reaction to 1.0, thereby producing the maximum reaction rate. After the conversion reaction is complete, the excess uncombined or free carbon is removed by introducing a CO$_2$/CO gas mixture of about 0.5 carbon activity, depending on the reaction temperature.

Figure 5:
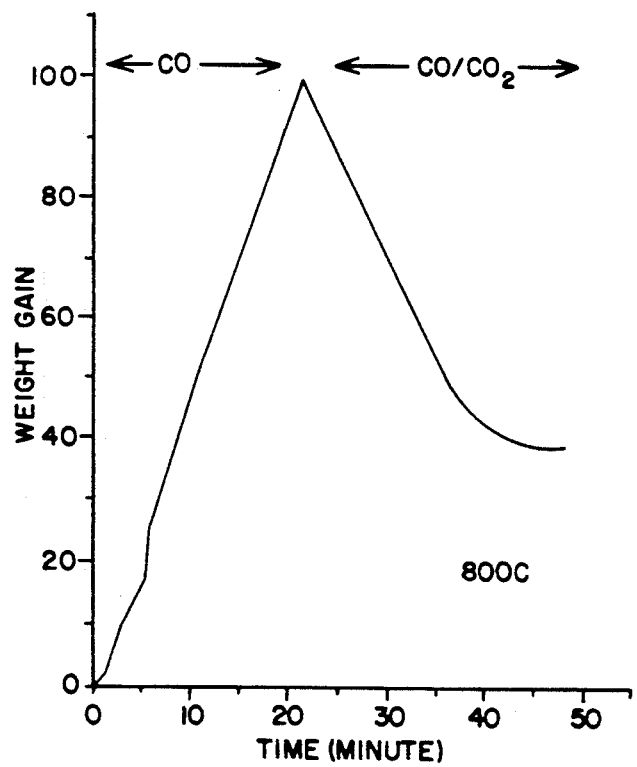
FIG. 5 is a thermogravimetric analysis trace of the carbothermic reaction synthesis of WC-10 wt % Co.

FIG. 5 shows a typical thermogravimetric analysis trace of such a carbothermic reaction treatment at 800° C. It is evident that the rapid carbon uptake greatly reduces the formation of a metastable intermediate phase and promotes the formation of WC-Co.

With reference to FIG. 5, during the first phase of carburization, corresponding to the addition of CO gas, carbon activity equals or exceeds 1.0. The CO gas undergoes catalytic decomposition and carbon precipitates on and is dispersed throughout the W-Co particles. The ultrafine microstructure is preserved during the time when carbon precipitation results in an almost one hundred percent increase in particle weight, as is indicated at the twenty minute mark of carburization.

Excess unreacted carbon is then removed by lowering the carbon activity to approximately 0.5 by altering the atmosphere to a CO/CO$_2$ mixture, wherein excess carbon reacts with CO$_2$ to form carbon monoxide:

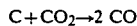

$$C + CO_2 \rightarrow 2\ CO$$

Carbon is removed, resulting in a rapid weight reduction which levels off approximately 20 minutes after reducing the carbon activity (or 40 minutes after initiating carburization). By means of thermal gravimetric analysis, the practitioner of the invention can determine the time at which to reduce the carbon activity and ultimately the time at which the carburization process is completed.

Figure 6:
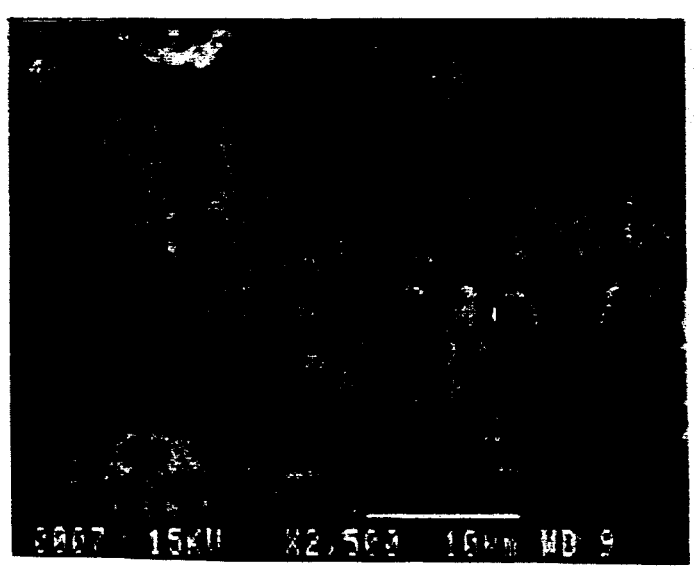
FIG. 6 are photomicrographs of the microstructures of converted powders.
Figure 6:
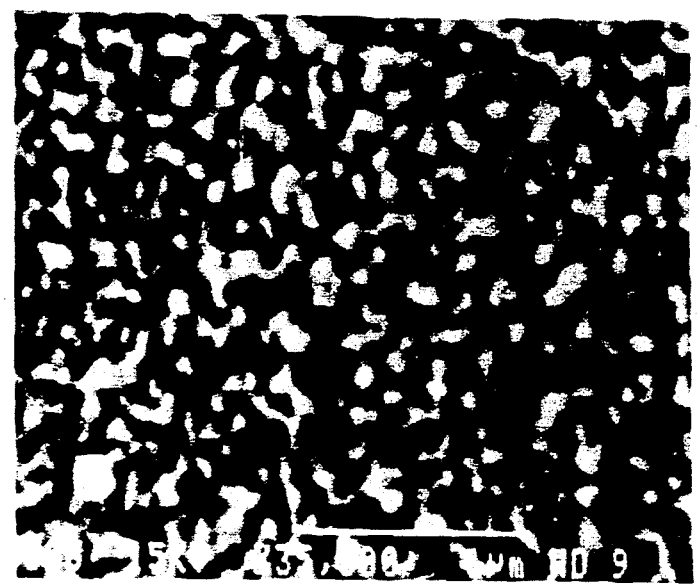
Figure 4:
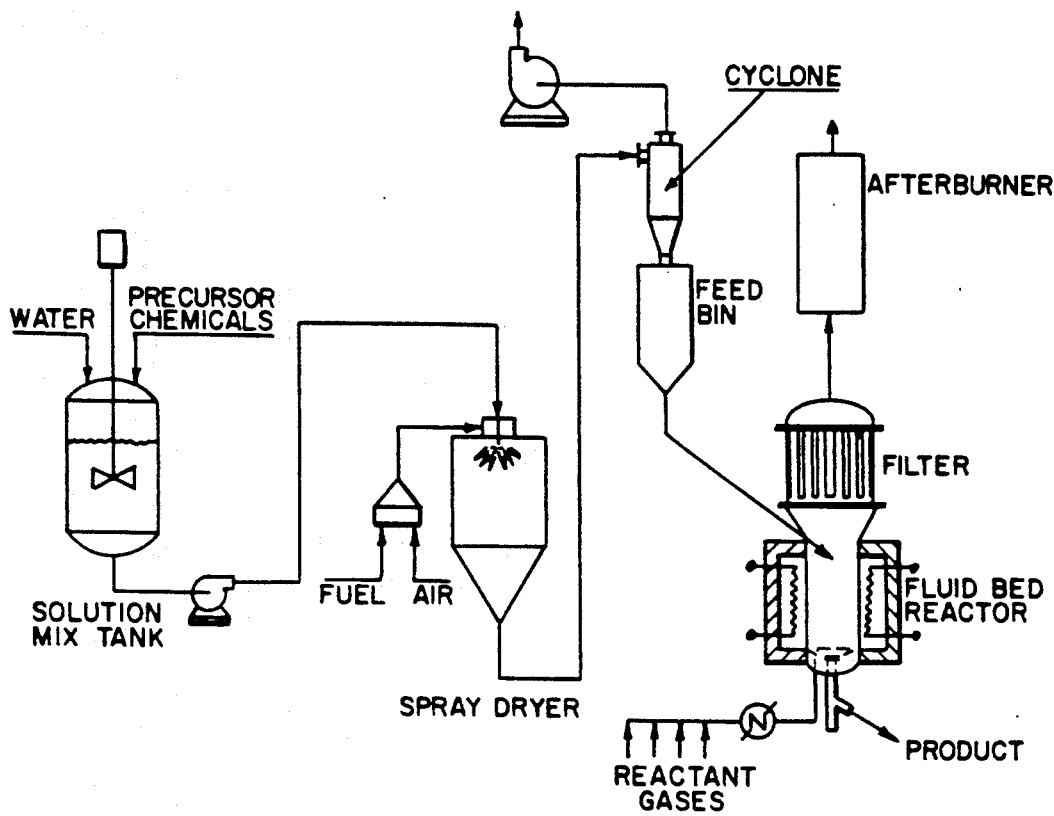
FIG. 4 is a flow diagram of the spray conversion process.
Figure 7:
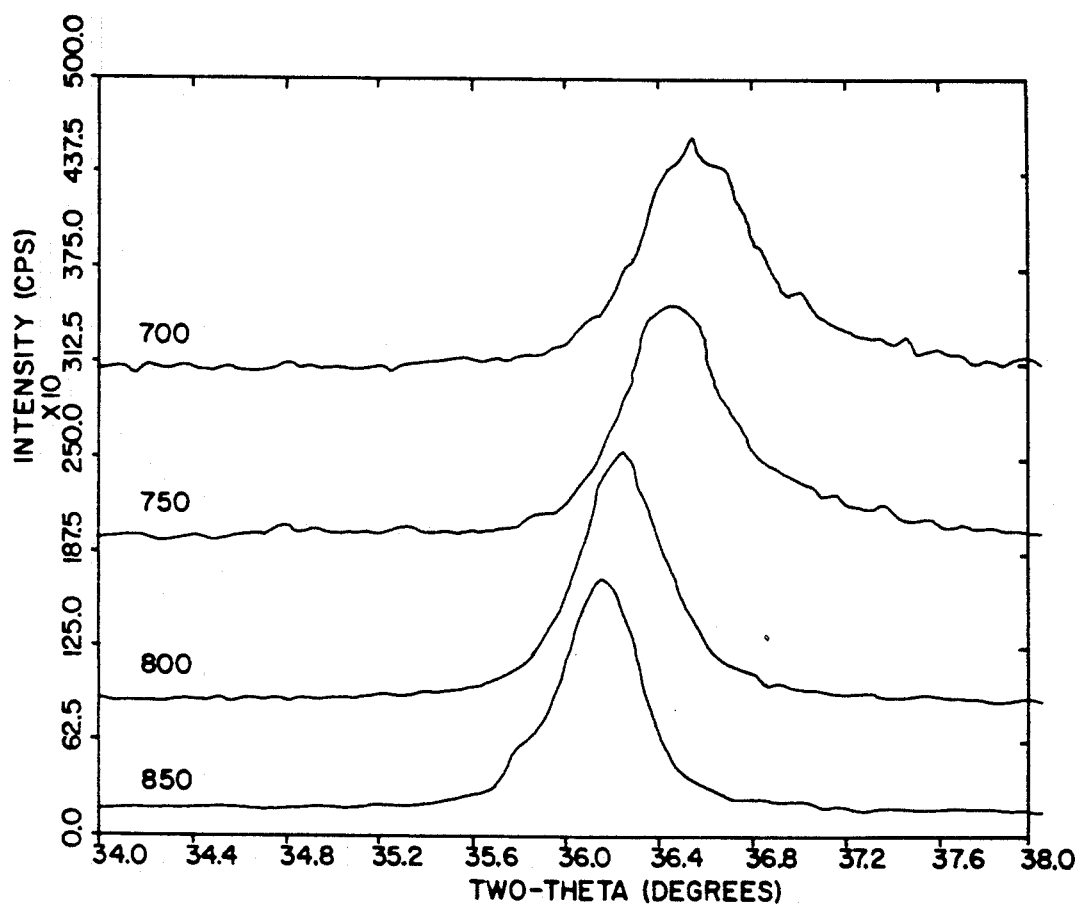
FIG. 7 depicts line broadening of the (100) WC diffraction peak from WC-10 wt % Co powder produced by carbothermic reaction at 700°, 750°, 800°, and 850° C.

FIG. 6 shows the corresponding microstructure of the converted powder with WC grain size between 30-100 nm. Further evidence for the grain size reduction with decreasing reaction temperature is shown in FIG. 7. It is seen that the 100 peak is both broadened and shifted as the synthesis temperature decrease and the grain size gets smaller.

The processes disclosed herein are compatible with existing conventional technologies for producing WC-Co powders, which involves the following sequence of steps:

1. A tungsten containing powder, usually ammonium paratungstate, is spread as a thin layer on graphite trays. The trays are placed in a muffle furnace where the salt is reduced to tungsten powder by a reducing gas.
2. The tungsten powder is removed from the furnace and mixed with carbon powder.
3. The mixture is again spread on the graphite trays, which are returned to the furnace where the tungsten reacts with the carbon at high temperature (1400–1600 C.) to form WC powder.

4. The WC powder is removed from the furnace and ball milled with Co powder in order to coat the WC particles with Co.
5. The WC-Co powder is combined with a binder, usually paraffin or polyethylene glycol, and spray dried to form a spherical grade powder. The binder acts as a die-wall lubricant in cold compaction of preforms prior to liquid phase sintering.

A novel variation of the conventional commercial process discussed above is to introduce carbothermic reaction processing as the means to produce WC-Co powder in a single step. Suitable equipment would include a muffle furnace. The homogeneous spray dried composite precursor powder, which might be pre-reduced or pre-oxidized and possibly carbon infiltrated, is spread on the graphite trays and further reaction processing is effected in the muffle furnace by setting the carbon activity of the reaction atmosphere by controlling the amount of CO and $CO_2$ entering the furnace and by further controlling the furnace temperature. A person skilled in the art would recognize that minimizing bed thickness enhances the addition or removal of carbon into or out of the particles so that mass transfer occurs uniformly throughout the bed. Not only does this process eliminate mechanical mixing steps (ball milling), it results in a WC-Co mixture of greater homogeneity, permits the carburization reactions to occur at much lower temperatures, and shortens the overall reaction times. Low reaction temperatures and short reaction times favor the formation of the finest microstructures.

A novel variation of the carbothermic process discussed above is to introduce carbon in the precursor solution, either as a fine dispersion or as a compound that can be readily carbonized (such as sucrose), rather than from the gas phase. Our experience with this variation has been that satisfactory carburization can be accomplished at reasonable reaction rates only at temperatures greater than 950° C. This is because solid-solid reactions are not as fast as gas-solid reactions, making it harder to develop and maintain nanostructures.

A concern with gas-solid reactions is the large amount of CO gas required to carburize W to WC; two moles of CO are required to produce one mole of WC. In the preferred embodiment of the carbothermic process, outlet gas that is rich in $CO_2$ gas is recycled through an external hot bed of carbon where $CO_2$ is converted back to CO. Thus, in this closed loop system carbon is transported in the gas phase from an external carbon source to the fluid bed reactor where the carburization of W occurs. An advantage of this process variation is the ability to independently control the temperature of the external carbon bed and that of the fluid bed reactor, which allows an increased degree of control compared to the case where carbon is supplied as a fine dispersion in the precursor powder.

The process discussed above shall now be set forth in greater detail with reference to the following examples.

EXAMPLES

Examples 1-3 describe preparation of suitable precursor compounds. Examples 4-8 were carried out in a thermogravimetric analyzer. Similar results were obtained on gram-scale quantities of powder in a tube furnace (fixed bed reactor). Examples 9-11 were carried out on kilogram-scale quantities of powder in 4", 6" or 14" diameter fluid bed reactors.

EXAMPLE 1

WC-23% Co from crystalline $Co(en)_3WO_4$ precursor powders.

An aqueous solution of $CoCl_2$ was combined with a solution of $H_2WO_4$ in ethylenediamine to precipitate crystalline $Co(en)_3WO_4$. Low concentrations of the reactants in these solutions produce hexagonal rods (20×100 microns) while high concentrations produced flat plates (20×5×1 microns).

When $Co(en)_3WO_4$ solution is spray dried the resulting microcystalline particles are spherical, and after fluid bed conversion to WC-Co, have microstructures that are identical to those obtained from the single crystal particles.

EXAMPLE 2

The use of WC-Co from amorphous/microcrystalline $Co(en)_3WO_4$ crystalline precursor, prepared under near equilibrium conditions by precipitation from solution, necessarily fixes the Co:W ratio at 1:1, which results in WC-23% Co powder after fluid bed conversion. In order to achieve a wider range of WC-Co compositions it is necessary to prepare homogeneous mixtures of $Co(en)_3WO_4$ with another source of W, e.g. $H_2WO_4$. This can be accomplished by rapid spray drying of mixtures of $Co(en)_3WO_4$ (solution A) and $H_2WO_4$ in aqueous $NH_4OH$ (solution B). For example, the Co/W ratio may be adjusted to the values of 1.0, 0.63, 0.21, and 0.1 by mixing appropriate quantities of solutions A and B. When these solutions are spray dried in a laboratory spray dryer fitted with a 2" rotary atomizer spinning at 35000 rpm; inlet and outlet temperatures 205° and 115° C., respectively; and a starting solution feed rate of 156 ml/min the resulting powders are amorphous or microcrystalline, depending on the Co/W ratio in the starting solution.

EXAMPLE 3

WC-Co from amorphous $AMT-CoCl_2$ precursor powders.

An alternative precursor solution, which is preferred solution, involves the use of ammonium metatungstate (AMT) and $CoCl_2.6H_2O$ or $Co(NO_3)_2.6H_2O$ or $Co(CH_3COO)_2.4H_2O$. The use of AMT is advantageous because of its high solubility in water and its commercial availability.

Solution C was prepared by dissolving AMT and $CoCl_2.H_2O$ or $Co(NO_3)_2.6H_2O$ or $Co(CH_3COO)_2.4H_2O$ in water. The Co:W ratio was fixed at 0.37, which yields 10% Co in the final WC-Co composite powder.

The starting solution was spray dried in a laboratory spray dryer fitted with a pressure nozzle atomizer (80 PSI). The inlet and outlet temperatures were maintained at a nominal 220° and 130° C. The feed solution was pumped into the dryer at 220 ml/min. SEM micrographs of the dried powder showed spherical particles, which were shown to be amorphous by X-ray diffraction.

EXAMPLE 4

Process at 850° C.

A 100 mg sample of $AMT/CoCl_2$ precursor powder, of a composition suitable for making WC-10 wt % Co, was reduced in flowing (90 cc/min) $Ar/H_2(2:3)$ for 45 minutes to yield 66 mg of porous nanophase W-Co.

Carbon infiltration was achieved using flowing CO (90 cc/min). The carbon uptake resulted in a weight increase to 76 mg in a 20 minute interval. During the next 24 minutes in a flowing $CO/CO_2$ stream ($a_c=0.5$) the carburization reaction was completed and the excess free carbon was removed. The final nanophase WC-Co powder sample weight was 70 mg.

EXAMPLE 5

Process at 800° C.

A 100 mg sample of $AMT/CoCl_2$ was converted to nanophase WC-Co powder, as in Example 1, but with a processing temperature of 800° C.; $Ar/H_2$ reduction for 45 minutes; carbon infiltration for 20 minutes; and carburization and free carbon removal for 24 minutes.

EXAMPLE 6

Process at 750° C.

A 100 mg sample of $AMT/CoCl_2$ was converted to nanophase WC-Co powder, as in Example 1, but with a processing temperature of 750° C. $Ar/H_2$ reduction for 90 minutes: carbon infiltration for 20 minutes; and carburization and free carbon removal for 90 minutes.

EXAMPLE 7

Process at 700° C.

A 100 mg sample of $AMT/CoCl_2$ was converted to nanophase WC-Co powder, as in Example 1, but with a processing temperature of 700° C.; $Ar/H_2$ reduction for 150 minutes; carbon infiltration for 35 minutes; and carburization and free carbon removal for 265 minutes.

EXAMPLE 8

Process at 700°/800° C.

A 100 mg sample of $AMT/CoCl_2$ was converted to nanophase WC-Co powder, as in Example 1, but with $Ar/H_2$ reduction for 150 minutes at 700° C.; carbon infiltration in CO for 35 minutes at 700° C.; heating to 800° C. in 10 minutes in flowing CO; and simultaneous carburization and free carbon removal in $CO/CO_2$ for 25 minutes at 800° C.

EXAMPLE 9

Process at 750° C.

A 890 g sample of spray dried $AMT/Co(NO_3)_2nH_2O$ precursor powder, of a composition suitable for making WC-10 wt % Co, was charged into a 4" diameter fluid bed reactor. The precursor powder was fluidized in $N_2$ gas at a velocity of 130 ft/min while the temperature was increased from room temperature to 700° C. in 10 minutes. At 700° C. the fluidization velocity was decreased to 60 ft/min and the fluidization gas was changed to $N_2/H_2$ (cracked $NH_3$) in a 1:3 ratio while the temperature was raised to 750° C. The precursor powder was reduced at this temperature for 110 minutes to form a nanophase W/Co composite powder. Next the fluidization gas was changed to pure CO at 30 ft/min for 100 minutes. During this period the W/Co particles were carburized to nanophase WC/Co and the bed temperature increased briefly to 800° C. due to the exothermic reaction. The 100 minute reaction time was required to completely eliminate all traces of $M_{12}C$ impurity. After completion of the carburization reaction, excess carbon was removed by fixing the carbon activity at 0.4 at 750° C. in a fluidizing gas mixture of $CO/CO_2$ (30 ft/min). All excess carbon was removed after 170 minutes and the reactor was allowed to cool to room temperature in a flow of $N_2$ at 10 ft/min. X-ray analysis showed that the product was free of $M_{12}C$ and thermogravimetric analysis confirmed the absence of uncombined carbon. The x-ray line broadening was consistent with a WC grain sizes on the order of 20 nm.

EXAMPLE 10

Process at 750° C.

A 1.6 kg sample of spray dried $AMT/Co(NO_3)_26-H_2O$ precursor powder, of a composition suitable for making WC-16 wt % Co, was charged into a 6" diameter fluid bed reactor. The precursor powder was fluidized in $N_2$ gas at a velocity of 130 ft/min while the temperature was increased from room temperature to 700° C. in 20 minutes. At 700° C. the fluidization velocity was decreased to 60 ft/min and the fluidization gas was changed to $N_2/H_2$ (cracked $NH_3$) in a 1:3 ratio while the temperature was raised to 750° C. The precursor powder was reduced at this temperature for 120 minutes to form a nanophase W/Co composite powder. Next the fluidization gas was changed to pure CO at 30 ft/min for 100 minutes. During this period the W/Co particles were carburized to nanophase WC/Co and the bed temperature increased briefly to 800° C. due to the exothermic reaction. The 100 minute reaction time was required to completely eliminate all traces of $M_{12}C$ impurity. After completion of the carburization reaction, excess carbon was removed by fixing the carbon activity at 0.4 at 750° C. in a fluidizing gas mixture of $CO/CO_2$ (30 ft/min). All excess carbon was removed after 180 minutes and the reactor was allowed to cool to room temperature in a flow of $N_2$ at 20 ft/min. X-ray analysis showed that the product was free of $M_{12}C$ and thermogravimetric analysis confirmed the absence of uncombined carbon. The x-ray line broadening was consistent with a WC grain sizes on the order of 20 nm.

EXAMPLE 11

Process In 14" Diameter Fluid Bed Reactor

A 14" diameter fluid bed reactor was equipped with a mechanical agitator to aid in the fluidization of a large powder charge, and with a gas preheater and freeboard heater to facilitate its isothermal operation. The reactor was preheated to 370° C. (nominal) before a 32 kg sample of spray dried and precalcined precursor powder, suitable for making WC-11 wt % Co powder, was added to the reactor. The powder was added incrementally to the reaction vessel via a double-ball-valve feed lock over a one hour period. Nitrogen gas was kept flowing in the vessel during the powder addition. The precursor powder was reduced in 1:1 $N_2:H_2$ gas as the reactor was heated from 635° C. to 750° C. (nominal) over a period of two hours. Carbon was added to the powder at 750° C. (nominal) for two hours using CO gas. Excess carbon was removed from the powder over a four hour period using a $CO_2/CO$ gas mixture. Because of insufficient gas preheating, the reactor could not be operated isothermally. Thus, during the critical final decarburization step of the process, the carbon activity varied between 0.3 and 0.7 due to temperature gradients within the reactor. This processing produced a pyrophoric WC-Co powder, which was passivated using $N_2/air$ mixtures. 25 kg of nanostructured WC-11 wt % Co powder was produced.

We claim:

1. A carbothermic reaction process for the production of nanophase metal/metal-carbide particles comprised of the steps of:
   a) obtaining porous precursor particles which act as substrates for carbon infiltration;
   b) infiltrating the porous precursor particles with a carbon source gas at a carbon activity greater than or equal to 1.0 to deposit amorphous carbon within pores of said particles; and
   c) simultaneously reacting the carbon and the source gas with the porous precursor powder particle substrates to form at least one carbide phase and removing remaining unreacted carbon by carburization using a gas with carbon activity less than 1.0.

2. The process as set forth in claim 1 wherein the precursor powder is obtained by subjecting a solution of metal ions, prepared by dissolution of metals or metal compounds, to a drying treatment selected from the group consisting of spray calcining, spray roasting, spray drying, or freeze drying.

3. The process as set forth in claim 2 wherein the precursor powder is further prepared by chemical reduction prior to carburization.

4. The process as set forth in claim 2 wherein the precursor powder is further prepared by an oxidation prior to carburization.

5. The process as set forth in claim 2 wherein the solution of metal ions is prepared from tungsten and cobalt compounds.

6. The process as set forth in claim 5 wherein the tungsten and cobalt compounds are ammonium metatungstate and cobalt nitrate, and the solution is aqueous.

7. The process as set forth in claim 1 wherein the infiltration with carbon from a carbon source gas is achieved with gases or gas mixtures selected from the group consisting of CO, $CO/CO_2$, or $CH_4/H_2$.

8. The process as set forth in claim 7 wherein the infiltration of the porous precursor powder particle with carbon is achieved using low temperature catalytic decomposition of the selected gas or gas mixture by the precursor powder particle substrate.

9. The process as set forth in claim 7 further including the step of recycling used carbon source gas through a carbon source gas regenerator.

10. The process as set forth in claim 1 wherein the removal of unreacted carbon is effected by a gasification reaction achieved with gases or gas mixtures selected from the group consisting of $CO_2$, $CO/CO_2$, or $CH_4/H_2$.

11. The carbothermic reaction process as set forth in claim 1 wherein the process is effected in a furnace selected from the group consisting of a tube furnace, a muffle furnace, a belt furnace, a rotary kiln, a fluid bed furnace, or furnace suited for heating the precursor powder and gases to temperatures up to 1000 C. and achieving infiltration of carbon from a carbon source gas at a carbon activity greater than or equal to 1.0 and removal of unreacted carbon by gasification using a gas or gas mixture having a carbon activity less than 1.0.

12. The process as set forth in claim 1 wherein the nanophase metal/metal-carbide particles produced are WC-Co composites.

13. A carbothermic reaction process for the production of nanophase metal/metal carbide particles comprised of the steps of:
   a) preparing porous precursor particles by partial or full chemical reduction, said porous precursor powders acting as substrates for carbon infiltration, the preparation of precursor powder being effected by subjecting a solution of metal ions prepared from tungsten or cobalt compounds to a drying treatment selected from the group consisting of: spray calcining, spray roasting, spray drying, or freeze drying;
   b) infiltrating the porous precursor particles with amorphous carbon from a carbon source gas or gas mixture at a carbon activity greater than or equal to 1.0, said carbon source gas being selected from the group consisting of CO, $CO/CO_2$, $CH_4/H_2$, and combinations thereof capable of achieving carbon deposition; said infiltrating of the porous precursor powders being achieved using low temperature catalytic decomposition of the selected gas or gas mixture by the precursor powder particle substrate;
   c) simultaneously reacting the carbon from the source gas with the porous precursor powder particle substrates to form at least one carbide phase;
   d) removing remaining unreacted carbon by gasification using a gas or gas mixture of carbon activity less than 1.0, the gas or gas mixture being selected from the group consisting of $CO_2$, $CO/CO_2$, $CH_4/H_2$, or combinations thereof capable of removing carbon;
said infiltrating and removing process steps being effected in a furnace selected from the group consisting of a tube furnace, a muffle furnace, a belt furnace, a rotary kiln, a fluid bed furnace, or furnace suited for heating the precursor powder and gases to temperatures up to 1000 C. and achieving infiltration of carbon from a carbon source gas at a carbon activity greater than or equal to 1.0 and removal of unreacted carbon by gasification using a gas or gas mixture having a carbon activity less than 1.0.

14. The process as set forth in claim 13 wherein the tungsten and cobalt compounds are ammonium metatungstate and cobalt nitrate and the solution is aqueous.

* * * * *